S. N. KRAWCHENKO.
MEASURING DEVICE.
APPLICATION FILED SEPT. 11, 1908.

933,764.

Patented Sept. 14, 1909.

WITNESSES:

INVENTOR
Samuel N. Krawchenko
BY Charles N. Butler
ATTORNEY

UNITED STATES PATENT OFFICE.

SAMEUL N. KRAWCHENKO, OF WILMINGTON, DELAWARE.

MEASURING DEVICE.

933,764.

Specification of Letters Patent.   Patented Sept. 14, 1909.

Application filed September 11, 1908.   Serial No. 452,679.

*To all whom it may concern:*

Be it known that I, SAMEUL N. KRAWCHENKO, a citizen of the United States, residing in the city of Wilmington, county of Newcastle, and State of Delaware, have invented certain Improvements in Measuring Devices, of which the following is a specification.

This invention is a measuring device designed to provide means whereby liquids commonly kept in bulk can be drawn from a tank or other container and measured in one operation, with avoidance of the loss of time, waste of material and uncleanliness involved in the ordinary method of measuring by means of a separate graduated vessel.

Figure 1:
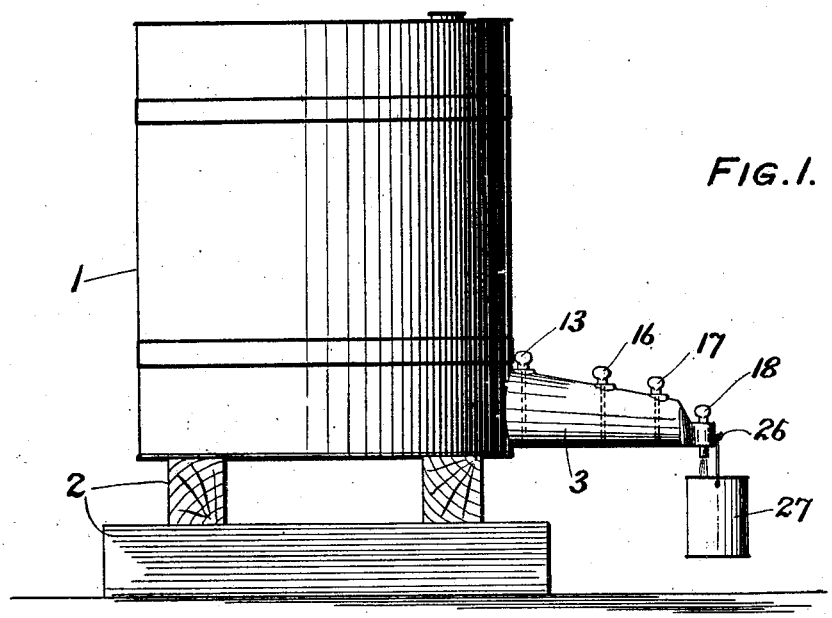
Figure 2:
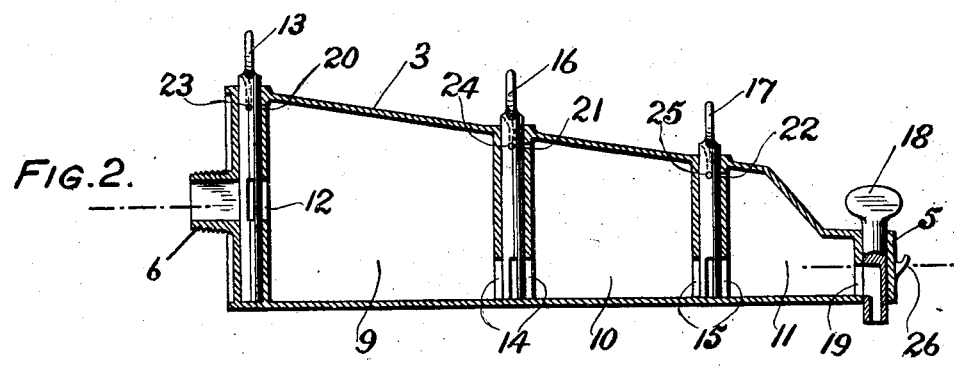
Figure 3:
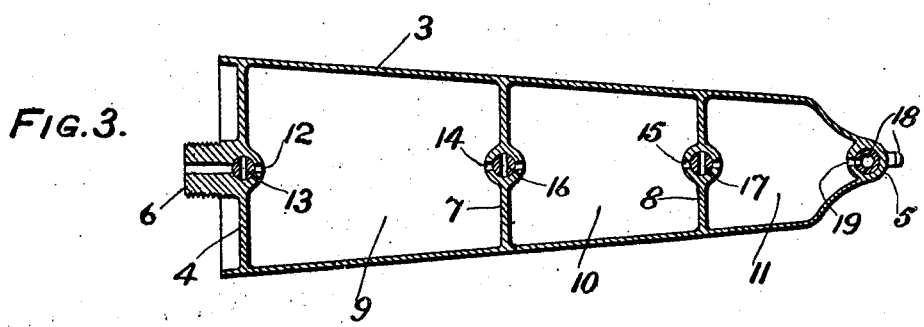

In the drawings, Figure 1 represents a side elevation of a tank with my improved measuring device attached thereto; Fig. 2 represents a longitudinal vertical sectional view through the center of the device; and Fig. 3 represents a horizontal sectional view of the device.

As shown in the drawings the tank 1 containing liquid in bulk is supported on a base 2. A receptacle comprising the body portion 3 and the end walls 4 and 5 has on the inner end thereof a hollow threaded hub 6 which screws into a suitable opening in the tank and supports the receptacle in a horizontal position. Partitions 7 and 8 divide the receptacle into compartments 9, 10 and 11 of different capacities, as for instance a gallon, quart and pint respectively.

Through the end wall 4 in registration with the passage through the hub is a port 12 controlled by a stop-cock 13 of usual type which is journaled in the wall, and through the bottoms of the partitions 7 and 8 are ports 14 and 15 controlled by similar stop-cocks 16 and 17 journaled in the respective partitions. A spigot 18 journaled in the end wall 5 communicates with the port 19 formed therein and provides an outlet for the chamber 11.

Near the tops of the partitions and walls are small holes 20, 21 and 22 which respectively register with apertures 23, 24, and 25 in the corresponding stop cocks when the latter are turned to open the ports, providing air vents to permit flow from the various chambers.

A hanger 26 on the end 5 provides a convenient means for supporting a vessel 27 to be filled.

When it is desired to draw off a certain amount of liquid, the outlet from the chamber having a capacity of the quantity desired is closed and the ports between it and the tank opened until the chamber is filled. The inlet to the chamber is then closed, the outlet ports opened and the liquid withdrawn through the spigot.

This device is particularly useful for retailing the more commonly used liquids, such as kerosene, which can be measured accurately in the manner described without the handling, waste and loss of time involved in the use of the usual measures.

Having described my invention, I claim:

1. A measuring device comprising a receptacle provided with end walls each having a passage therethrough and a partition forming compartments, said partition having a passage therethrough by which said compartments are adapted to communicate, and independent valves having stems revoluble respectively in said walls and partition for controlling said passages.

2. A measuring device comprising a body having an end wall with a threaded hub thereon, said wall and hub having a passage therethrough, a valve journaled in said wall for controlling said passage, an apertured partition dividing said body into compartments having different capacities, a valve journaled in said partition for controlling the aperture therethrough, said body also having an end wall having a passage therethrough, and a valve for controlling said end wall passage, each of said valves being adapted for operation independently of the others.

3. A measuring device comprising a tapering body having at the larger end thereof a wall provided with a threaded hub, said wall and hub having a passage therethrough, a valve for controlling said passage, one or more partitions forming several compartments of capacities decreasing from the larger to the smaller end of said body, a valve or valves for effecting communication between said compartments, at the smaller end of said body a wall containing a passage, a valve for controlling said passage last named, and a hanger adapted for supporting a vessel, each of said valves being adapted for operation independently of the others.

4. A measuring device comprising a receptacle provided with end walls each having a passage therethrough, a partition forming compartments, said partition having passages therethrough by which said compartments are adapted to communicate with each other and with the outer air, and a valve in said partition for simultaneously controlling said passages.

In witness whereof I have hereunto set my name this 9th day of September, A. D. 1908, in the presence of the subscribing witnesses.

SAMEUL N. KRAWCHENKO.

Witnesses:
LAWRENCE J. BROMAN,
JOS. G. DENNY, Jr.